(No Model.)

J. A. ADAMS.
SPRING MOTOR.

No. 450,953. Patented Apr. 21, 1891.

Witnesses
L. P. Hayden.
A. P. Wood.

Inventor
James A. Adams
By his Attorney
Albert H. Wood.

THE NORRIS PETERS CO., PHOTO-LITHO., WASHINGTON, D. C.

United States Patent Office.

JAMES A. ADAMS, OF ATLANTA, GEORGIA.

SPRING-MOTOR.

SPECIFICATION forming part of Letters Patent No. 450,953, dated April 21, 1891.

Application filed September 15, 1890. Serial No. 365,090. (No model.)

*To all whom it may concern:*

Be it known that I, JAMES A. ADAMS, a citizen of the United States, and a resident of Atlanta, in the county of Fulton and State of Georgia, have invented certain new and useful Improvements in Spring-Motors; and I do declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of motors in which the power is stored in springs to be applied at the will of the operator, the object being to simplify such devices and reduce friction therein to a minimum, the details of construction whereby these ends are attained being hereinafter fully specified and claimed.

Figure 1:
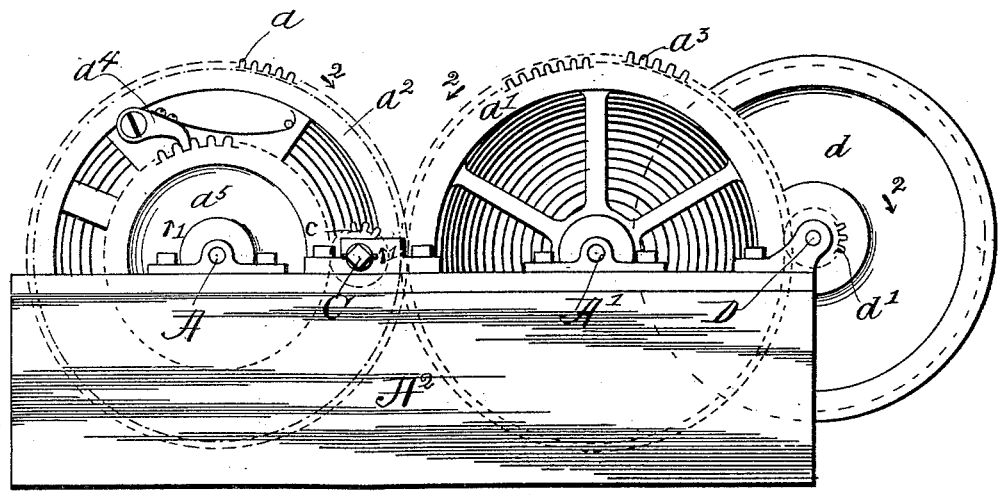
Figure 2:
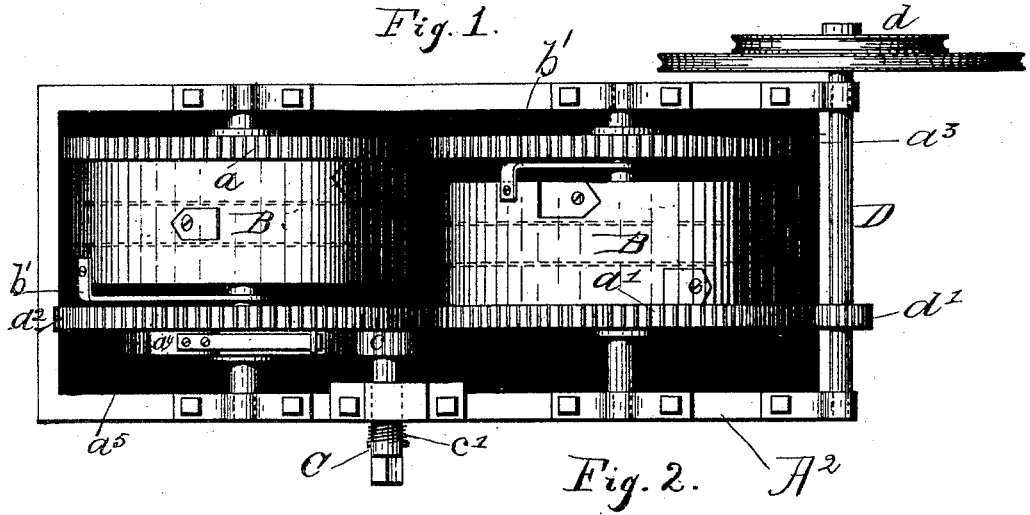
Figure 3:
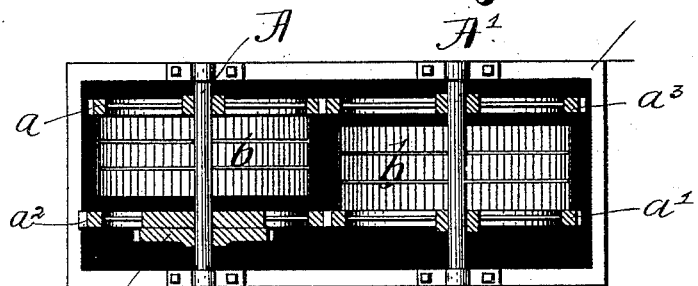

In the accompanying drawings, Figure 1 is a side elevation of the device with the upper half or cover of the casing removed, showing the interior construction. Fig. 2 is a plan of the device as seen in Fig. 1, further illustrating the elements therein shown. Fig. 3 is a horizontal section through the center of the various gears, shafts, &c.

In the figures like reference-marks indicate corresponding parts in all the views.

The casing $A^2$ may be made of any form desired, and of wood or metal, it being preferable that to be adapted both in form of construction and material to the duty which the motor is to perform and the position it is to occupy, the shafts A and A' are journaled in suitable bearings in or on the casing, and have loosely revolving thereon the gears $a$ and $a'$, respectively, which said gears carry suitably secured thereto the spring-barrels B, to which are attached in any suitable manner the outer ends of the springs $b$, their inner ends being secured to the shafts A and A'. In the construction shown the ends of the barrels B, opposite the gear $a$ and $a'$, are journaled on the shafts by means of cross-bars $b'$, which are secured to the said barrels, each having a hole for the insertion of the shaft. The gears $a'$ and $a$ mesh, respectively, with other gears $a^2$ and $a^3$ on the shafts A and A', respectively, which gears $a^2$ $a^3$ have a greater number of teeth than the gears $a$ and $a'$. The gear $a^3$ is tight on the shaft, but the gear $a^2$ is loose thereon, but revolves with the shaft A in one direction by reason of the engagement of the spring-pressed pawl $a^4$ on said wheel with the teeth of the wheel $a^5$, which is secured to the shaft A beside the wheel $a^3$. The pinion $c$ on the shaft C, which shaft is journaled in the casing, is caused to engage with the gear $a^5$ in winding the motor, the shaft D and the wheels $a^3$ and $a'$, carrying the spring-actuated pawl $a^4$ of the motor, being held stationary by the application of the hand to the wheel $d$ while the operation of winding takes place. The shaft C has end-play in its bearing, and is, together with the gear, held normally withdrawn sidewise from contact with the gear $a^5$ by a spring $c'$, one end of which is confined to the shaft C and the other bears on the box wherein the said shaft is journaled. The said shaft C is adapted to receive on its outer end a key or crank for purpose of winding.

A shaft D is carried in bearings on the casing or other suitable position having a fly and band wheel $d$ thereon, and a pinion $d'$ engaging with the gear $a'$ or other wheel most convenient, the size of the said wheel $d'$ being governed, as are all the others, by the spring-power and speed and force desired to obtain.

The operation of this device is as follows: To wind, the shaft C is pressed inwardly so as to cause the gears $a^2$ and $c$ to mesh by a crank previously placed on its end, and while the motion of the gears $a'$ and $a^2$ is prevented by holding the wheel $d$ from revolving, the said shaft C and hence the wheels $c$ and $a^2$ and the shaft A are revolved in the direction of the arrows $l$ in Fig. 1, which will wind the inner end of the spring on the shaft, which winding will continue until a slight excess of power to overcome friction is stored in the springs on the shaft A, which excess of power will, through the barrels B and wheels $a$ and $a'$, be communicated to the other spring and be there stored, inasmuch as the shaft A', to which these latter springs are attached by their inner ends, is fast to the wheel $a^3$, and hence cannot revolve and exhaust the power. Thus both sets of springs will be wound and kept at a balance, which balance is retained until both are exhausted. After the winding shall have been accomplished to the desired extent, the shaft C is allowed to be returned by the spring C' to its normal position, when the motor is free to run as follows: The power which it is possible to develop in this device is governed by the differentiality of the gears $a$ and $a'$, $a^2$, and $a^3$, the power being exerted by the springs through the gears $a$ and $a'$, which are attached to the spring-barrels and mesh with the gears $a^2$ and $a^3$, and are slightly smaller in diameter than said gears $a^2$ and $a^3$, and hence will revolve said gears and the shafts A and A' at a slower speed, thus winding back into the springs part of the gross power exerted thereby, and by means of a gear $d'$, meshing with the desired one of the other gears the power forming the remainder after the subtraction of the restored power.

Having thus described my invention, what I claim as new, and desire to secure by Letters Patent of the United States, is—

1. In a device of the class specified, the shafts A and A', the two gears of larger diameter, each secured to one of the said shafts, and two gears of smaller diameter, each running loosely on one of said shafts, the barrels B B, secured to the said smaller gears, and the springs winding on each of the said shafts and within the said barrels and attached at their outer ends to the said barrels, substantially as and for the purpose specified.

2. In a device of the class described, as a means for utilizing a multiplicity of springs, the combination of the shaft A, held stationary except when the spring is being wound, and carrying loosely mounted thereon a gear $a$, the shaft A', having a gear $a^3$ secured thereto and a gear $a'$ loosely revolving thereon, the barrels B B, secured to the gears $a$ and $a'$, and the springs secured to and adapted to be wound on said shafts and within the barrels B B, their outer ends being secured to the said barrels, substantially as and for the purpose specified.

In testimony whereof I hereunto affix my signature in presence of two witnesses.

JAMES A. ADAMS.

Witnesses:
A. P. WOOD,
W. B. REEVES.